United States Patent [19]

Dzioba

[11] Patent Number: 4,821,605
[45] Date of Patent: Apr. 18, 1989

[54] TRANSMISSION SHIFT CONTROL ASSEMBLY

[75] Inventor: Donald L. Dzioba, Midland, Mich.

[73] Assignee: General Motors Corporation, Detroit, Mich.

[21] Appl. No.: 189,856

[22] Filed: May 3, 1988

[51] Int. Cl.$^4$ .............................................. E05B 65/12
[52] U.S. Cl. .................................. 74/850; 192/4 A; 74/475; 74/483 R; 70/248
[58] Field of Search ................ 74/475, 483 R, 850; 70/247, 248; 192/4 A

[56] References Cited

U.S. PATENT DOCUMENTS

| | | | |
|---|---|---|---|
| 3,901,097 | 8/1975 | Williams et al. | 70/248 X |
| 4,537,088 | 8/1985 | Kubota | 74/475 |
| 4,671,085 | 6/1987 | Yamaguchi et al. | 70/248 |
| 4,712,397 | 12/1987 | Niskanen | 70/248 |
| 4,724,722 | 2/1988 | Beauch et al. | 74/483 R X |

Primary Examiner—Peter A. Aschenbrenner
Attorney, Agent, or Firm—D. F. Scherer

[57] ABSTRACT

A transmission shift control assembly has a rotary arm member to which a transmission shift control cable is attached. The rotary motion at the arm member translates to linear motion at the cable. A manual lever is pivotally mounted on the arm member for rotation therewith to permit operator selection of the desired transmission operating condition. The manual lever cooperates with a detent control member to position the shift control at the selected transmission operating condition. There is also disposed on the detent control mechanism an ignition interlock latching mechanism which is operable to prevent removal of the shift control mechanism from the "Park" position prior to unlocking of the ignition lock and to prevent locking of the ignition lock prior to the transmission control mechanism being placed in the "Park" position.

3 Claims, 3 Drawing Sheets 4,821,605

TRANSMISSION SHIFT CONTROL ASSEMBLY

BACKGROUND OF THE INVENTION

This invention relates to transmission control systems and more particularly to manually operated transmission control mechanisms.

In column mounted shift control mechanisms which utilize cable members for a connection between the operator control and the transmission manual valve, there are two basic type systems. These systems can be referred to as concentric or linear shift type systems.

In the concentric shift type system, the shift mechanism is rotatable either about the axis of the steering column or an axis substantially parallel the steering column. The transmitter cable of the concentric type system is generally connected to an arm near the lower end of the steering column and from there routed to the transmission. Concentric shift mechanisms generally require a shift bowl, a long shift tube, mounting brackets and support bearings for supporting the shift tube for rotary movement within the brackets.

With linear shift type systems, the transmission shift cable is generally routed parallel to the steering column longitudinal axis and is connected to a member that is pivotally mounted for moving the cable in a substantially linear path.

Steering column mounted linear shift mechanisms disclosed in the prior art utilize a ball and cam system for transferring from the rotary motion of the shift lever to linear motion of the shift cable. An example of a system such as this is shown in U.S. Pat. No. 4,733,573 issued Mar. 29, 1988, to Kramer and assigned to the assignee of the present invention. It should be noted that with this linear shift mechanism, the manual shift lever is rotatable about the longitudinal axis of the steering column. The linear shift system eliminates the long shift tube utilized with the concentric system and replaces it with a cam driver mechanism which can introduce lash into the system and can require intricate assembly.

SUMMARY OF THE INVENTION

It is preferable to use a linear shift system when a shift cable is to be utilized between the operator control and the transmission shift valve. As a general rule, the cable mechanisms permit adjustment or alignment at assembly in a manner that is much simpler than a linkage system. Flexible cable mechanisms also permit adjustment during the life of the mechanism, if such is desirable, and in many instances, automatic adjusting is designed into the flexible cable mechanisms.

The present invention utilizes a linear shift mechanism in a steering column mounted arrangement. The mechanism disclosed herein has a manual operator control that is rotated, about an axis which is neither coaxial or parallel with the longitudinal axis of the steering column when transmission operating conditions are selected. By moving the rotary axis of the manual lever from the steering column axis, a more compact and simplified assembly is achieved.

There is also provided with the present invention, an ignition interlock mechanism which prevents the operator from moving the shift lever from the "Park" position prior to the ignition lock mechanism being manipulated from the "Lock" position and also preventing the ignition lock mechanism from being manipulated to the "Lock" position prior to the shift lever being moved to the "Park" position.

It is therefore an object of this invention to provide an improved transmission shift control assembly having a cable drive arm body rotatably mounted in a bracket on a steering column for rotation about an axis nonparallel with the longitudinal axis of the steering column, and wherein the bracket includes a detent gate and the central assembly has an operator lever which is pivotally mounted in the driver arm body, has a portion cooperating with the detent gate to establish the transmission operating positions and is operable to permit the operator to move the cable driver arm to select the desired transmission operating conditions.

It is another object of this invention to provide an improved steering column mounted shift control assembly, wherein the manual operator lever is mounted on a cable drive arm body for rotation with the body about an axis which is nonparallel with the longitudinal axis of the steering column to control the cable driver arm for establishing the transmission operation condition, and wherein a detent plate cooperates by engaging with an extension of the manual operator lever for establishing the operating condition, and also wherein the manual lever is pivotable relative to the driver arm body to permit disengagement of the extension and the detent plate so that the operator arm can be rotated to select a new transmission operating condition through linear movement of a control cable connected with the cable drive arm.

It is a further object of this invention to provide an improved steering column mounted shift control mechanism wherein the operator control lever and a cable driver arm are rotatably mounted on an axis nonparallel with the steering column axis and also wherein the operator control lever cooperates with a detent plate mechanism for transmission operating condition selection, and further wherein there is provided an ignition interlock member which is pivotally mounted on the detent plate member and is selectively positioned by the ignition control mechanism to prevent removal of the operator lever from the "Park" position prior to the ignition control being unlocked and positionable by the shift lever or an extension thereof, to prevent the ignition control from being locked prior to the manual operator lever being placed in the "Park" position.

These and other objects and advantages of the present invention will be more apparent from the following specification and drawings.

DESCRIPTION OF THE EMBODIMENT

Figure 1:
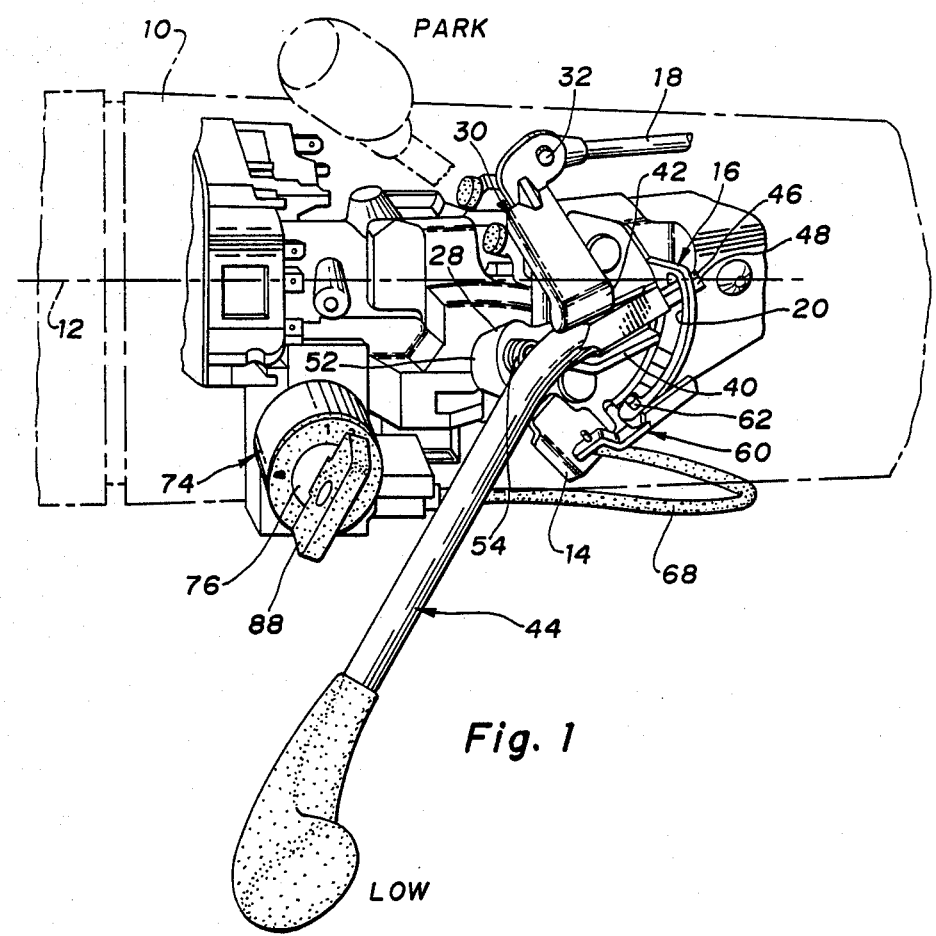
FIG. 1 is a perspective view of an exemplary embodiment of the invention.

Referring to the drawings, and particularly FIG. 1, there is seen a steering column 10 having a longitudinal axis 12. A mounting bracket 14 is secured to the steering column 10 and has integrally formed therewith or otherwise secured thereto a detent plate or portion 16. The detent portion 16 has a detent gate 20 which is comprised of a series of steps and slots such as those shown at 22 and 24 in FIG. 5. These steps or slots are designed to provide position stops for the conventional and well known transmission operating conditions, such as Park "P", Reverse "R", Neutral "N", Drive "D" and Low "L". The steering column 10 also supports a cable bracket, not shown, which bracket has connected therewith a cable 18.

Figure 2:
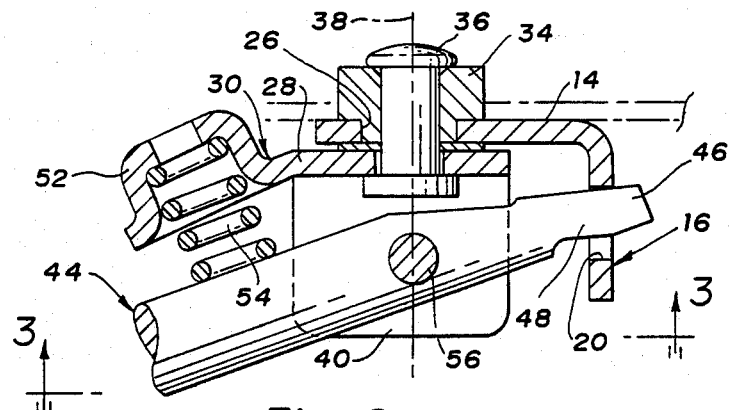
FIG. 2 is a top elevational view of a portion of the embodiment shown in FIG. 1.

The bracket 14, as best seen in FIG. 2, has formed therein an opening or aperture 26 in which is rotatably disposed a body 28 which has formed integral therewith a cable drive arm 30. The cable drive arm 30 has a cable connector 32 to which is connected the movable portion of the cable 18 which is disposed in the cable attachment, not shown. The body 28 and the driver arm 30 are supported by a bearing member 34 and are positioned in the aperture 26 by a rivet or similar fastener 36.

The body 28 is rotatably mounted on an axis 38 which passes through the rivet 36. The body 28 has a pair of upstanding side walls 40 and 42. Pivotally mounted on the body 28 between the walls 40 and 42 is an operator control lever 44. One end 46 of the control lever 44 forms a positioning arm 48 which has a portion thereof disposed in the detent gate 20.

Figure 5:
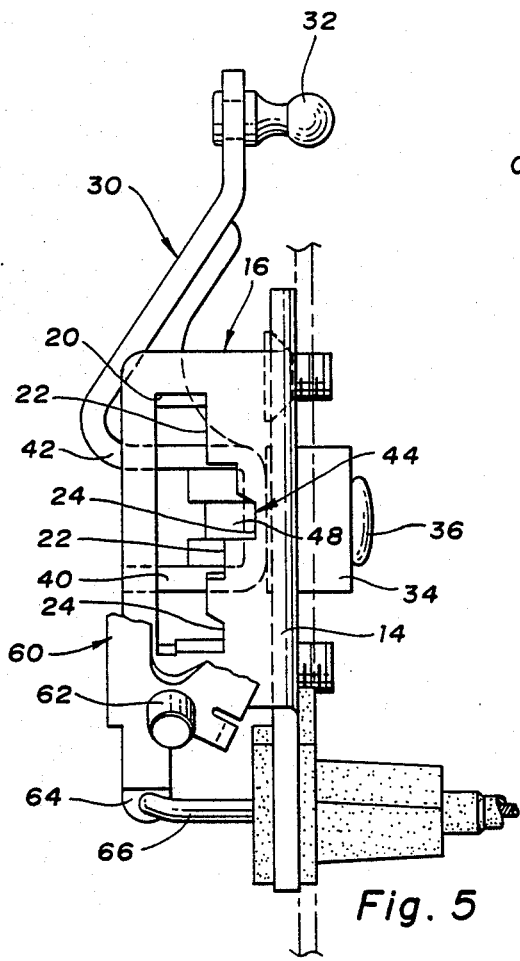
FIG. 5 is a view taken along line 5—5 of FIG. 3.

As seen in FIG. 5, the detent gate 20 has a pair of slots 24 and three steps 22. These provide the stops for transmission operating.

The body 28 has an extension 50 in which is formed a pocket 52 for supporting a lever return spring 54 which abuts the operator control lever 44. As seen in FIG. 2, the return spring 54 urges the operator lever 44 to a position such that the positioning arm 48 can be engaged by one of the steps and slots of the detent gate 20.

The operator can pivot the control lever 44 about a mounting pin 56 so as to remove the positioning arm 48 from the slots and steps of detent gate 20 so that the control lever 44, body 28 and cable driver arm 30 can be manually rotated about an axis 58 which extends through mounting rivet 36. This permits the operator to establish the desired transmission operating condition.

Figure 3:
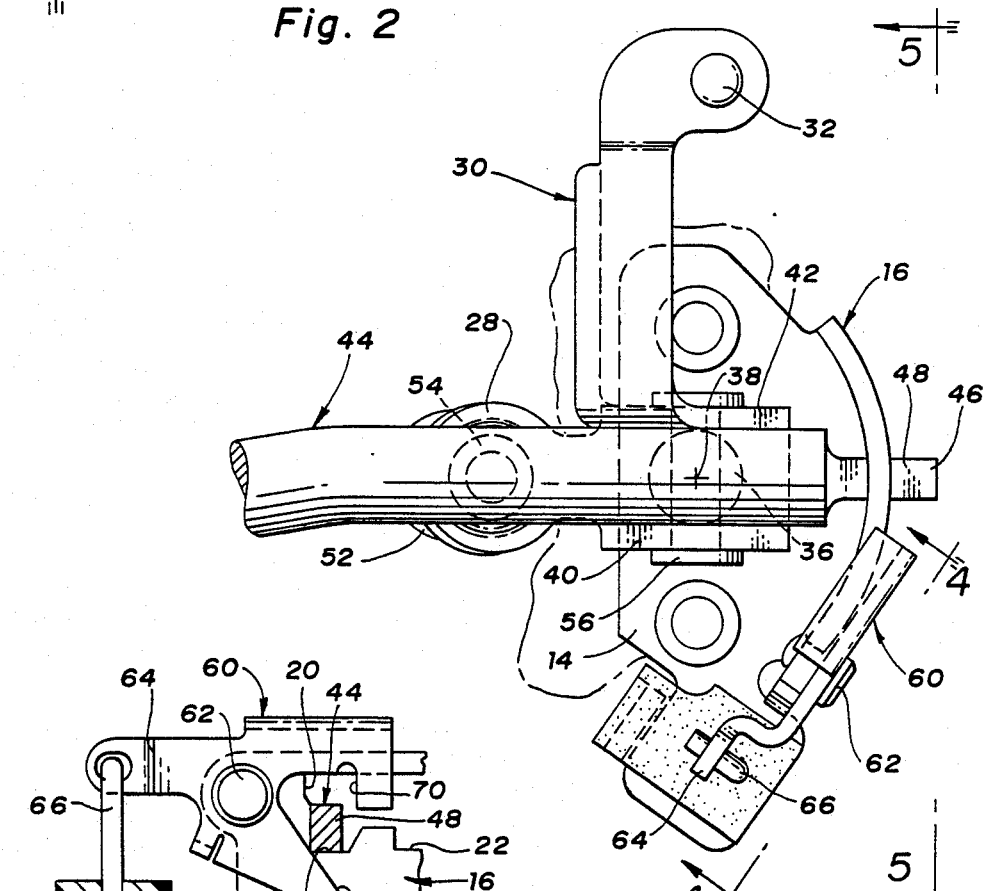
FIG. 3 is a view taken along line 3—3 of FIG. 2.
Figure 4:
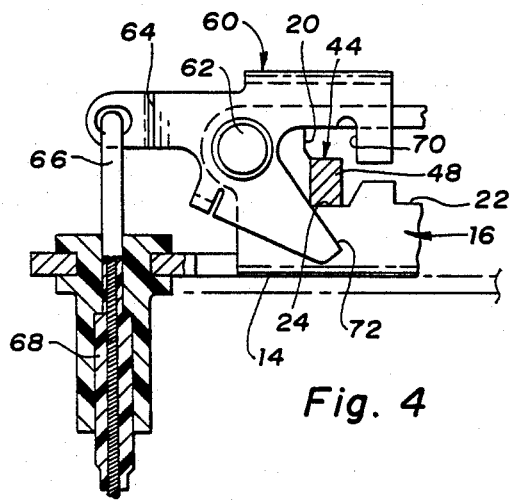
FIG. 4 view taken along line 4—4 of FIG. 3.

In FIGS. 3, 4 and 5, there is seen a portion of an ignition interlock mechanism which includes a latching plate 60 pivotally mounted by a pin 62 on the detent plate 16. The latching plate 60 has an extension 64 in which is secured a cable member 66. The cable member 66 has a sheath 68 which is secured to the detent plate 16. The other end of cable 66 is connected to an ignition locking mechanism, as seen in FIG. 6.

The latch plate 60 has a locking surface 70 and a positioning surface 72. As seen in FIG. 4, the locking surface 70 is positionable in the opening of the detent gate 20 adjacent one of the slots 24. This slot 24 is the disposition of the positioning arm 48 when the transmission "Park" condition is selected.

Figure 6:
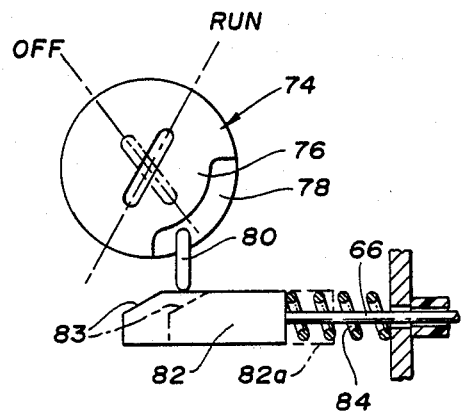
FIG. 6 is a diagrammatic representation of a portion of the ignition interlock mechanism.

FIG. 6 describes diagrammatically a portion of the ignition interlock mechanism to which the latching plate 60 is connected. The ignition lock mechanism 74, shown in FIG. 6, is similar to the lock mechanism shown in U.S. Pat. No. 4,724,722, issued Feb. 16, 1988, to Beauch et al., and assigned to the assignee of the present invention.

The ignition lock mechanism includes a key cylinder 76 which has formed therein a slot 78 in which is positioned a lock pin 80. The lock pin 80 is disposed between the slot 78 and a plunger 82. The plunger 82 is connected to the cable 66 which is also, as previously described, connected to the latch plate 60.

A spring member 84 urges the plunger 82 to the left, as seen in FIG. 6. In this position, the lock pin 80 is out of contact with a ramp portion 83 formed on the plunger 82. Movement of the cable 66 to the right moves the plunger 82 against the spring 84 to the phantom position shown at 82a. In this position, the lock pin 80 can exit the slot 78 and permit sufficient rotation of the lock cylinder 76 such that the ignition lock mechanism can be locked. However, when the ignition lock mechanism is moved to the lock position, the lock pin 80 acts on the ramp 83 to prevent the plunger 82 from returning to the spring set position.

The positioning arm 48, as seen in FIG. 4, is disposed in the "Park" position. It can also be seen that the locking surface 70 will prevent the positioning arm 48 from being removed from "Park" to the "Reverse" position. The locking surface 70 is maintained in this locking position as long as the ignition lock mechanism is maintained in the locked condition. As previously mentioned, in this condition, the lock pin 80 prevents the plunger 82 from moving leftward which would permit pivoting of the latch plate 60 about pin 62.

When the positioning arm 48 is in the "Park" position of the detent gate 20, the return spring 52 of operator control lever 44 is sufficiently strong to cause the arm 48 to engage surface 72 and pivot the latch plate 60 in a clockwise direction, as seen in FIG. 4. It is this movement that causes the plunger 82 to move rightward and therefore permit locking of the ignition locking mechanism 74.

From the "Lock" position of the ignition lock mechanism 74, the ignition key 88 (FIG. 1) can be turned to the start or run position. In this condition, the lock pin 80 is free to move into the slot 78 if the plunger 82 is urged leftward by the spring 84. When the operator moves the shift control lever 44 to the position A shown in FIG. 7, the spring 84 can then urge the plunger 82 to the position shown in FIG. 6 and simultaneously move the latch plate 60 in a counterclockwise direction to the position shown in FIG. 7.

Figure 7:
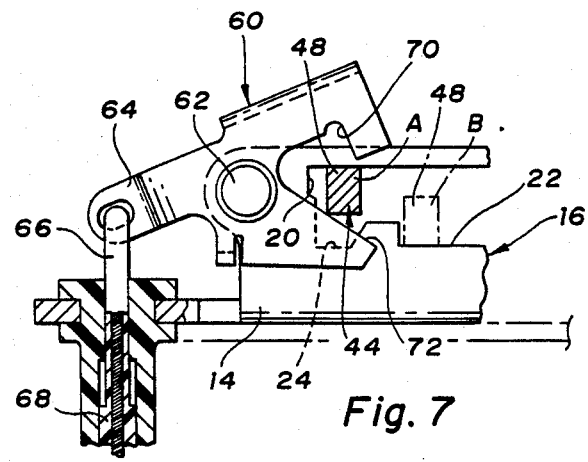
FIG. 7 shows a portion of the ignition interlock in an alternate operating condition.

As seen in FIG. 7, this will permit the positioning arm 48 to be moved out of the "Park" position to the "Reverse" position B or other operating condition that the operator might desire. Once having moved the transmission control lever from the "Park" position, the latch plate 60 will remain in the position shown in FIG. 7, so that the plunger 82 will cooperate with the lock pin 80 and prevent the ignition lock mechanism from being turned to the "Lock" position.

As is well known, unless the ignition lock mechanism is fully locked, the ignition key cannot be removed. When the operator lever 44 is moved to the "Park" position and released, the positioning arm 48 will pivot the latch plate 60 to the position shown in FIG. 4 thereby moving the plunger 82 to the position 82a so that locking of the ignition lock mechanism can occur.

It will be apparent from the above description that the transmission lever cannot be removed from the "Park" position prior to the ignition lock mechanism being unlocked. It will also be apparent from the above description that the ignition lock mechanism cannot be locked nor the key removed until the transmission control lever 44 is placed in the "Park" position. This provides a desired interlock between the transmission and the vehicle ignition system.

Obviously, many modifications and variations of the present invention are possible in light of the above teaching. It is therefore to be understood, that within the scope of the appended claims, the invention may be practiced otherwise than as specifically described.

The embodiments of the invention in which an exclusive property or privilege is claimed are defined as follows:

1. A transmission shift control assembly mounted on a steering column having a longitudinal axis comprising: bracket means secured to said steering column; transmission shift cable means having a portion secured to said bracket means and a portion linearly movable relative to said secured portion; mounting means on said bracket cable drive arm means having an axis and being rotatably mounted on said rotary axis on said mounting means oblique to said longitudinal axis and including a cable connecting portion secured to said movable portion of said cable means and lever mounting means adjacent said mounting means; operator control means including lever means, pin means for pivotally mounting said lever means on said lever mounting means on an axis substantially perpendicular to said rotary axis and positioning arm means formed on said lever means and extending from said pin means; detent gate means disposed on said bracket means in position to abut said positioning arm means for limiting the extent of pivotal movement of said lever means, said detent gate means including a gear select detent plate means for engaging said positioning arm means at one pivotal extent for establishing operating positions in a transmission; and spring means for urging said positioning arm into said detent gate means, said lever means being disposed for manipulation by an operator for pivoting said operator control means on said pin means and for rotating said operator control means and said cable drive arm means for selectively positioning said shift cable means to control the transmission at the operating position established by said detent plate means.

2. A transmission shift control assembly mounted on a steering column having a longitudinal axis comprising: bracket means secured to said steering column; transmission shift cable means having a portion secured to said bracket means and a portion linearly movable relative to said secured position; cable driver arm means having a rotary axis and being rotatably mounted on the rotary axis on said bracket means and including a cable connecting portion secured to said movable portion of said cable means and a pair of upstanding wall members disposed adjacent said rotary axis; operator control means including a control lever, pin means for pivotally mounting said control lever between said upstanding wall members on an axis substantially perpendicular to said rotary axis and positioning arm means formed on said control lever extending from said pin means; detent gate means disposed on said bracket means in position to abut said positioning arm means for limiting the extent of pivotal movement thereof, said detent gate means including a gear select detent plate means for engaging said positioning arm means at one pivotal extent for establishing operating positions in a transmission; and spring means disposed between said control lever and said cable driver arm means for urging said positioning arm into said detent gate means toward said one pivotal extent; said operator control means being manipulable by an operator through the use of said lever for pivoting said control lever on said pin means and for rotating said operator control means and said cable drive arm means for selectively positioning said shift cable means to control the transmission.

3. A transmission shift control assembly mounted on a steering column having an ignition lock means and a longitudinal axis comprising: bracket means secured to said steering column; transmission shift cable means having a portion secured to said bracket means and a portion linearly movable relative to said secured portion; cable driver arm means having a rotary axis and being rotatably mounted on the rotary axis on said bracket means and including a cable connecting portion secured to said movable portion of said cable means; operator control means including a lever and pin means for pivotally mounting said lever on said cable drive arm means and positioning arm means extending from said lever on the opposite side of said pin means; detent gate means disposed on said bracket means in position to abut said positioning arm means for limiting the extent of pivotal movement thereof, said detent gate means defining an arcuate path for unrestricted movement of said positioning arm means including a gear select detent plate means for engaging said positioning arm means at one pivotal extent for establishing operating positions in a transmission; spring means for urging said positioning arm into said detent gate means; and ignition interlock means including a latch plate pivotally mounted on said detent plate means and having a locking surface means alignable with the arcuate path of said positioning arm means to prevent unauthorized movement of the operator control means from a "Park" position and positioning surface means disposed for abutment by said positioning arm means when said "Park" position is attained for pivoting said latch plate for alignment of said locking surface means, said latch plate being connected with the ignition lock means and being freed for pivotal movement thereby to permit pivoting of the latch plate when the ignition lock means is placed in an "Unlocked" position and said operator control means is moved from said "Park" position.

* * * * *